(12) United States Patent
Abergel et al.

(10) Patent No.: US 12,133,001 B2
(45) Date of Patent: Oct. 29, 2024

(54) METHOD FOR CONSTRUCTING A HIGH-RESOLUTION MERGED SIGNAL OR IMAGE FROM A LOW-RESOLUTION PLURALITY OF SIGNALS OR A LOW-RESOLUTION PLURALITY OF IMAGES

(71) Applicants: UNIVERSITE PARIS CITE, Paris (FR); CENTRE NATIONAL DE LA RECHERCHE SCIENTIFIQUE, Paris (FR); Centre National d'Études Spatiales, Paris (FR)

(72) Inventors: Rémy Abergel, Paris (FR); Andrés Almansa, Paris (FR); Gwendoline Blanchet, Toulouse (FR); Christophe Latry, Toulouse (FR); Lionel Moisan, Paris (FR)

(73) Assignees: UNIVERSITE PARIS CITE, Paris (FR); CENTRE NATIONAL DE LA RECHERCHE SCIENTIFIQUE, Paris (FR); Centre National d'Études Spatiales, Paris (FR)

( * ) Notice: Subject to any disclaimer, the term of this patent is extended or adjusted under 35 U.S.C. 154(b) by 42 days.

(21) Appl. No.: 18/079,700

(22) Filed: Dec. 12, 2022

(65) Prior Publication Data
US 2023/0105475 A1  Apr. 6, 2023

Related U.S. Application Data

(63) Continuation of application No. PCT/FR2021/051041, filed on Jun. 10, 2021.

(30) Foreign Application Priority Data

Jun. 12, 2020 (FR) .................................... 20/06182

(51) Int. Cl.
*H04N 23/80* (2023.01)
*H04N 5/265* (2006.01)
*H04N 7/18* (2006.01)

(52) U.S. Cl.
CPC ............. *H04N 23/80* (2023.01); *H04N 5/265* (2013.01); *H04N 7/183* (2013.01)

(58) Field of Classification Search
CPC ........ H04N 23/80; H04N 5/265; H04N 7/183; G06T 5/73; G06T 2207/10016; G06T 5/50
See application file for complete search history.

(56) References Cited

U.S. PATENT DOCUMENTS 6,166,384 A * 12/2000 Dentinger ................. G06T 5/73
  250/371
8,724,928 B2 * 5/2014 Deever ................ H04N 23/951
  345/698

(Continued)

OTHER PUBLICATIONS

International Search Report issued in corresponding International Application PCT/FR2021/051041, mailed Sep. 29, 2021.

*Primary Examiner* — Hung H Lam
(74) *Attorney, Agent, or Firm* — Burris Law, PLLC

(57) ABSTRACT

A method for constructing a high-resolution merged signal from low-resolution signals acquired by an acquisition device includes acquisition of low-resolution signals (BR), measurement and/or estimation of acquisition parameters, pre-merging of the signals as a function of the low-resolution signals and of the parameters, filtering of the pre-merged signal, transmission of the filtered pre-merged signal and of the parameters, calculation of an estimate of the pre-merged signal by an inverse filtering of the filtered pre-merged signal, and determination, according to a variational method, of the high-resolution merged signal from the estimate of the pre-merged signal and of the parameters, a (Continued)

resolution of the merged signal is greater than a resolution of each signal.

14 Claims, 1 Drawing Sheet

(56) References Cited

U.S. PATENT DOCUMENTS

2010/0054613 A1* 3/2010 Henry .................. H04N 19/117
 382/233
2012/0147205 A1* 6/2012 Lelescu ................ H04N 23/951
 348/E5.024

* cited by examiner

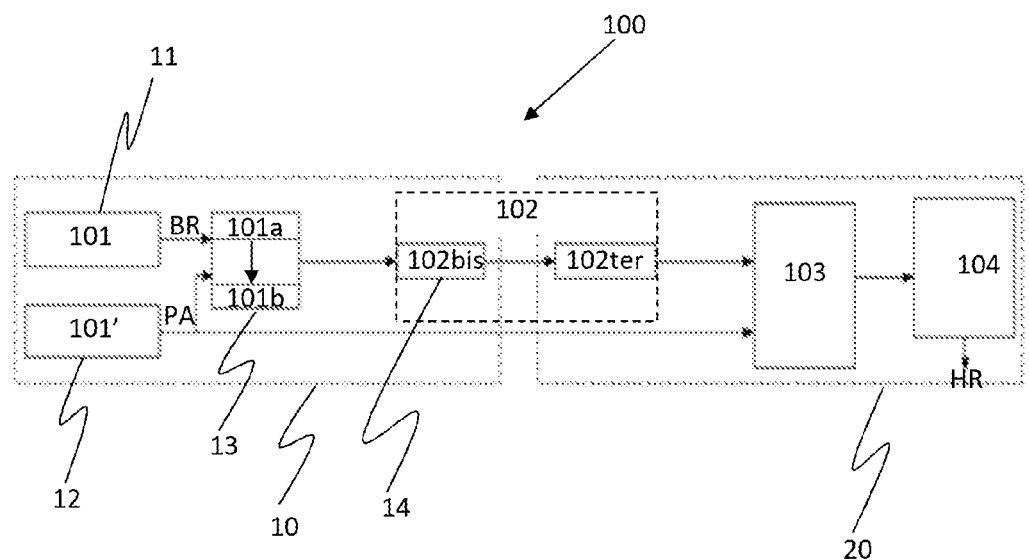

METHOD FOR CONSTRUCTING A HIGH-RESOLUTION MERGED SIGNAL OR IMAGE FROM A LOW-RESOLUTION PLURALITY OF SIGNALS OR A LOW-RESOLUTION PLURALITY OF IMAGES

CROSS-REFERENCE TO RELATED APPLICATIONS

This application is a continuation of International Application No. PCT/FR2021/051041, filed on Jun. 10, 2021, which claims priority to and the benefit of French Patent Application No. FR 20/06182 filed on Jun. 12, 2020. The disclosures of the above applications are incorporated herein by reference.

FIELD

The present disclosure relates to the field of image processing in order to merge several images into a single image of higher resolution, the method being implemented, on the one hand, on a segment on-board the acquisition device, and, one the other hand, on a segment less constrained in calculation power.

BACKGROUND

The statements in this section merely provide background information related to the present disclosure and may not constitute prior art.

It is known to use an image acquisition means to acquire a succession of images of a fixed scene, the acquisition means being provided with a device for precisely estimating the movements of the acquisition means between each shoot. It is then possible, according to methods known to those skilled in the art, to merge the acquired successive images to obtain an image of higher resolution than the acquired images.

The drawback of known merging methods is that they require very significant calculation power, which may not be available on the segment on-board which the image acquisition means is embedded, the segment possibly may be a space or air segment, or also the mobile terminal of a user. It is then possible, and also known, to transmit the acquired data to a ground segment, or to a remote server, less constrained in terms of calculation power. The drawback of this transmission step is twofold: on the one hand, it generally desires a step of compressing/decompressing the acquired data, in order to adapt to the bandwidth of the data transmission means; the compression/decompression step then being liable to degrade the quality of the data, when the volume of data to be transmitted, and consequently the compression ratio required for their transmission, is significant. The degradation of the data quality induced by the data transmission is not without impact on the final quality of the merged image. On the other hand, this transmission step induces a high cost, in terms of energy, and/or time, and/or consumed bandwidth.

SUMMARY

This section provides a general summary of the disclosure and is not a comprehensive disclosure of its full scope or all of its features.

To this end, the present disclosure relates to a method for constructing a merged signal, the merged signal being called a high-resolution signal, from a plurality of signals acquired by an acquisition device, each signal of the plurality of signals being called low-resolution signal, each signal comprising a plurality of samples measured by an acquisition sensor of the acquisition device configured according to a set of acquisition parameters of the signal, the set of acquisition parameters of each low-resolution signal comprising a sampling interval according to at least one dimension, the sampling interval corresponding to a resolution of the low-resolution signal, the resolution of the low-resolution signal being less than a resolution of the high-resolution signal.

The acquisition device includes the acquisition sensor configured to acquire the plurality of low-resolution signals, measurement equipment configured to measure and/or estimate the acquisition parameters, an on-board calculation unit, and a data transmission unit, configured to transmit data to a remote calculation unit.

The method comprising the following steps: acquisition of the plurality of low-resolution signals; measurement and/or estimation of the set of acquisition parameters; pre-merging of the plurality of signals into a pre-merged signal, by a calculation carried out by the on-board calculation unit, the pre-merged signal being a function of the plurality of signals and of the set of acquisition parameters of each low-resolution signal of the plurality; filtering of the pre-merged signal, carried out by the on-board calculation unit; transmission, by the transmission unit to the remote calculation unit, of the filtered pre-merged signal and of the set of acquisition parameters of each of the plurality of signals, without transmission of the plurality of signals; calculation, by the remote calculation unit, of an estimate of the pre-merged signal by an inverse filtering of the filtered pre-merged signal; and determination, by the remote calculation unit, according to a variational method, of the high-resolution merged signal from the estimate of the pre-merged signal and of the set of acquisition parameters of each of the plurality of signals, a resolution of the high-resolution merged signal being greater than a resolution of each of the plurality of signals.

According to these provisions, the step of calculating the filtered pre-merged signal may be carried out by the on-board calculation unit, endowed with limited calculation resources.

According to these provisions, the volume of the data of the filtered pre-merged signal is less than the total volume of the data of the plurality of signals and of the same order as the volume of data of a reference signal which would be acquired by the acquisition device configured according to a sampling interval corresponding to the resolution of the merged signal.

According to one implementation, the present disclosure comprises one or more of the following characteristics, alone or in a technically acceptable combination.

According to one implementation, each low-resolution signal of the plurality of low-resolution signals is a low-resolution image of a plurality of low-resolution images of a scene, in which the pre-merged signal is a pre-merged image, and in in which the filtered pre-merged signal is a filtered pre-merged image, in which the high-resolution merged signal is a merged image called a high-resolution image, in which the set of acquisition parameters of each low-resolution image further comprises a plurality of offsets, each offset of the plurality of offsets being associated with a low-resolution image of the plurality of images, the offset associated with the low-resolution image corresponding to a displacement of the acquisition device relative to the scene between the acquisition of the low-resolution image and the acquisition of a subsequent low-resolution image, and in which the at least one dimension of the sampling interval of a low-resolution image corresponds to at least one direction defined in a formation plane of the low-resolution image on the acquisition sensor.

According to these provisions, the step of calculating the filtered pre-merged image may be performed by the on-board calculation unit, endowed with limited calculation resources.

According to these provisions, the volume of the data of the filtered pre-merged image is less than the total volume of the data of the plurality of images and of the same order as the volume of data of a reference image which would be acquired by the acquisition device configured according to a sampling interval corresponding to the resolution of the merged image.

According to one implementation, each low-resolution signal of the plurality of low-resolution signals is an interferogram of a plurality of interferograms, or respectively an interferometric cube of a plurality of interferometric cubes, in which the high-resolution merged signal is a spectrogram, or respectively a hyperspectral cube, in which the set of acquisition parameters comprises a plurality of path differences, each path difference of the plurality of path differences being associated with an interferogram of the plurality of interferograms, or respectively with an interferometric cube of the plurality of interferometric cubes.

According to one implementation, the transmission step comprises a step of compressing, then decompressing, the transmitted filtered pre-merged image;

According to these provisions, the filtered pre-merged image received is the pre-merged image filtered, compressed and then decompressed.

According to these provisions, with limited on-board calculation resources, it is possible to further reduce the quantity of data to be transmitted and/or to reduce the loss of information linked to the step of compression then decompression for the same volume of transmitted data.

According to one implementation, a component of the displacement corresponding to each offset of the plurality of offsets is measured with a precision lower than the sampling interval along the axis of the low-resolution image with which the offset is associated, in one form with a precision of the order of a tenth, or a hundredth of the sampling interval.

According to one implementation, the plurality of signals is modeled by the application of a linear operator to a reference signal acquired by the acquisition sensor of the acquisition device configured according to a sampling interval corresponding to the resolution of the high-resolution merged signal, and wherein the pre-merging step comprises applying an adjoint operator of the linear operator to the plurality of signals.

According to these provisions, the pre-merging step does not introduce any loss of useful information in the sense that certain merging algorithms, in one form variational methods with an attachment to quadratic data, do not require knowledge of the plurality of signals but only knowledge of the pre-merged signal.

According to these provisions, the pre-merging step limits the information losses linked to the compression/decompression steps that may be implemented during the transmission step, compared to the information losses that would be associated with the compression/decompression steps if the plurality of signals were transmitted with the same volume of compressed data.

According to one implementation, the filtering step does not modify the pre-merged signal.

According to one implementation, the filtering step comprises applying, to the pre-merged signal, the pseudo-inverse of the product of the adjoint operator and of the linear operator.

According to these provisions, if the product of the adjoint operator and of the linear operator is well conditioned, the filtered pre-merged image obtained with the pseudo-inverse operator is more regular than the pre-merged image, so that it will be compressed more efficiently.

According to these provisions, the conditioning of the product of the adjoint operator and of the linear operator depends on the uniformity of the distribution of the plurality of offsets modulo the sampling interval of the signals.

According to these provisions, the conditioning of the product of the adjoint operator and of the linear operator is a function of the number of images of the plurality of images acquired, in one form as a function of the ratio between the number of images of the plurality of images, and the product of the down-sampling factors according to all the sampled dimensions. The down-sampling factors correspond for each sampled dimension to the ratio between the value of the sampling interval according to this dimension for the low-resolution signals and the value of the sampling interval according to the same dimension for the reference signal.

According to one implementation, the filtering step comprises applying the pseudo-inverse of a linear combination of the identity operator and of the product of the adjoint operator and of the linear operator.

According to these provisions, if the product of the adjoint operator and of the linear operator is poorly conditioned, the linear combination makes it possible to improve the conditioning of the filtering of the pre-merged image by replacing the poorly conditioned product by the better conditioned linear combination.

The present disclosure also relates to a device for acquiring a signal for constructing a merged signal, the merged signal being called a high-resolution signal, from a plurality of signals acquired by an acquisition sensor of the acquisition device, each signal of the plurality of signals, being called a low-resolution signal, and comprising a plurality of samples measured by the acquisition sensor configured according to a set of acquisition parameters of the signal, the set of acquisition parameters of each low-resolution signal comprising a sampling interval along at least one dimension, the sampling interval corresponding to a resolution of the low-resolution signal, and the resolution of the low-resolution signal being less than a resolution of the high-resolution signal. The device comprising: the acquisition sensor configured to acquire the plurality of low-resolution signals, measurement equipment configured to measure and/or estimate the acquisition parameters, an on-board calculation unit. The on-board calculation unit comprises a module for processing the plurality of signals configured to pre-merge the plurality of signals by calculating a pre-merged signal, as a function of the plurality of signals and of the set of acquisition parameters of each of the plurality of signals; and a filtering module configured to filter the pre-merged signal. The device further comprises a data transmission unit configured to transmit the filtered pre-merged signal and the set of acquisition parameters to a remote calculation unit, without transmission of the plurality of signals.

According to these provisions, the remote calculation unit may calculate an estimate of the pre-merged signal by an inverse filtering of the filtered pre-merged signal, then determine, according to a known variational method, the high-resolution signal from the estimate of the pre-merged signal and from the set of acquisition parameters for each of the plurality of signals.

According to one form, the present disclosure further comprises one or more of the following characteristics, alone or in a technically acceptable combination.

According to one form, the signal is an image of a scene, and in which the set of acquisition parameters of each low-resolution image further comprises a plurality of offsets, each offset of the plurality of offsets being associated with a low-resolution image of the plurality of images, the offset associated with the low-resolution image corresponding to a displacement of the acquisition sensor relative to the scene between the acquisition of the low-resolution image and the acquisition of a subsequent low-resolution image, and in which at least one dimension of the sampling interval of a low-resolution image corresponds to at least one direction defined in a formation plane of the low-resolution image on the acquisition device, in which the processing module is configured to calculate a pre-merged image; and in which the filter module is configured to filter the pre-merged image. The device further comprising a data transmission unit configured to transmit the filtered pre-merged image and the set of acquisition parameters to a remote calculation unit, without transmission of the plurality of images.

According to these provisions, the remote calculation unit may calculate an estimate of the pre-merged image by an inverse filtering of the filtered pre-merged image, then determine, according to a known variational method, the high-resolution image from the estimate of the pre-merged image and from the set of acquisition parameters of each of the plurality of images.

According to one form, the acquisition sensor is modeled by a linear operator, and in which the pre-merging comprises applying the adjoint operator of the linear operator to the plurality of images.

According to one form, the filtering step includes applying, to the pre-merged image, the pseudo-inverse of a linear combination of the identity operator and of the product of the adjoint operator and of the linear operator.

The present disclosure also relates to a computer program comprising instructions executable on an on-board computer and instructions executable on a remote computer, the executable instructions being configured to implement the method according to any of the implementations described above when the instructions are executed respectively on the on-board computer and on the remote computer.

The present disclosure also relates to a use of the method according to any of the forms described above, for merging the images acquired by an acquisition device according to any of the implementations described above, operably coupled to a portable computer so that the portable computer comprises the on-board calculation unit of the device and the unit of transmission to a remote calculation unit, the portable computer is a tablet or a smart phone.

The present disclosure also relates to a use of the method according to any of the forms described above, for merging the images acquired by an acquisition device according to any of the implementations described above, the acquisition device being on-board an aircraft, in one form a drone.

The present disclosure also relates to a use of the method according to any of the forms described above, for merging the images acquired by an acquisition device according to any of the implementations described above, the acquisition device being a medical imaging system.

The present disclosure also relates to a use of the method according to any of the forms described above, for merging the images acquired by an acquisition device according to any of the implementations described above, the acquisition device being a space imaging system carried by a satellite.

The present disclosure also relates to a use of the method according to any of the implementations described above, for merging into a spectrogram the interferograms of a plurality of interferograms acquired by a Michelson interferometer, or by a static Fourier transform interferometer, the interferometer being in one form of the SIFTI type, or for merging into a hyperspectral cube the interferometric cubes of a plurality of interferometric cubes acquired by a spectro-imager, the spectro-imager being in one form of the SIELETERS type.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a presentation of a logic diagram of an implementation of a method according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described in the context of spatial imaging, but this is only one, non-limiting example of possible applications of the present disclosure. Those skilled in the art will understand that the present disclosure may just as easily be applied to the reconstruction of a high-resolution signal, on remote and powerful calculation means, by the application of a conventional variational method, to a plurality of low-resolution signals acquired by means of an acquisition device having limited calculation means on-board.

The acquisition device may be for in one form a smart phone equipped with a camera and motion sensors configured to acquire and preprocess on-board a burst of images, called low-resolution images, before transmitting the pre-processed images to a remote calculation means to reconstruct images of higher resolution, called high-resolution images.

The acquisition device may also be on-board an airplane, with or without a pilot, the device comprising a camera and a system for estimating motion in one variation.

The device may also be a medical imaging system, configured to acquire, register, preprocess the medical images before transmitting the preprocessed images with the appropriate registration information to a remote calculation means.

The method according to the present disclosure may be applied to monochromatic or multispectral images, in one variation images acquired on 3 or 4 spectral channels, the method being applied separately on each channel.

More generally, the method according to the present disclosure applies to a stack of low-resolution signals resulting, in one variation, from the indirect measurement of a hyperspectral cube, such as signals which are obtained in a hyperspectral acquisition system by interferometry.

By convention, we will call low-resolution signal the signal(s) acquired by the device for acquiring the signal(s) before the signal(s) is/are processed by the calculation means on-board the acquisition device, then transmitted to a remote calculation means. The low-resolution signal qualification does not prejudge the resolution of the signal in absolute terms, but only indicates that the low-resolution signal is of a lower resolution than the resolution of the signal which will be reconstructed by the remote calculation means.

By convention also, we will call high-resolution signal the signal of resolution greater than the resolution of the previously defined low-resolution signals, which is reconstructed by the remote calculation means, from the data transmitted by the acquisition device, that is to say from preprocessed low-resolution signals and a set of parameters for acquiring the low-resolution signals.

As indicated above, the method according to the present disclosure potentially applies to a great diversity of signals, in one form to images. By convention, we will consider here that an image is a two-dimensional signal.

The method according to the present disclosure is particularly advantageous when the possibility of constructing a high-resolution image and of denoising a plurality of signals, in one form, images, of good quality is limited by two constraints:

A storage and calculation power constraint on-board, that is to say on the platform on-board which the signal acquisition device is embedded, the platform may be for example a computer, a tablet, a smart phone, or a drone, a satellite, or a medical imaging system;

A constraint of transmission of data to the remote means, that is to say on the ground when the device is on-board an air or space means.

These two constraints are in a way in competition because:

A remote digital processing makes it possible to circumvent the constraints of processing on-board and to use better super-resolution algorithms, that is to say configured to construct a high-resolution signal from a plurality of low-resolution signals, but it desires transmission to the remote means the plurality of low-resolution and noisy images, therefore weakly compressible, which reduces the acquisition capacity;

A digital processing on-board the acquisition device allows less data to be transmitted, but is limited by on-board storage and calculation resources.

The present disclosure makes it possible to overcome these two constraints by distributing the processing between:

A rapid step of pre-merging the data on the platform or the acquisition device;

A remote reconstruction step requiring more significant calculation and storage resources.

A detailed description of a variation of implementation of the method according to the present disclosure is presented below with reference to FIG. 1.

The method according to the present disclosure is implemented by and on an acquisition device 10 comprising: an acquisition sensor 11 configured to acquire a plurality of low-resolution signals BR, measurement equipment 12 configured to measure and/or estimate the acquisition parameters PA, an on-board calculation unit 13, and a data transmission unit 14, configured to transmit data to a remote calculation unit 20.

The acquisition sensor may be in one form an optical observation instrument on-board a satellite or an aircraft configured to acquire a series of low-resolution images of a scene, in one form a portion of the earth's surface, at successive instants, and while the satellite or aircraft is scrolling above the ground.

Each low-resolution signal, or image, BR comprises a plurality of samples measured by the sensor of the acquisition device, the sensor being configured to acquire the signal according to a set of acquisition parameters PA, the set of acquisition parameters PA of each low-resolution signal comprising in one form a sampling interval along at least one dimension, the sampling interval corresponding to a resolution of the low-resolution signal BR.

In the case of a space image sensor carried by a scrolling satellite, the at least one dimension of the sampling interval of a low-resolution image corresponds to at least one direction defined in a formation plane of the low-resolution image on the acquisition device. Usually, the at least one dimension comprises the two sampling directions of each low-resolution image, the low-resolution image forming a matrix of samples, that is to say of pixels, of dimension equal to the number of samples in one direction, multiplied by the number of samples in the other direction.

The set of acquisition parameters may also comprise, in the case of a space image sensor carried by a scrolling satellite, a plurality of offsets, each offset of the plurality of offsets being associated with a low-resolution image of the plurality of images acquired by the sensor, the offset associated with the low-resolution image corresponding to a displacement of the acquisition device relative to the scene between the acquisition of the low-resolution image and the acquisition of a subsequent low-resolution image.

The measurement equipment 12 configured to measure and/or estimate the acquisition parameters PA may, in one form, be a motion detector of the platform which carries the acquisition sensor 11.

The on-board calculation unit 13 is configured to receive the plurality of low-resolution signals, or images, and the set of acquisition parameters PA corresponding to the plurality of signals, or images; The on-board calculation unit 13 may be a calculator on-board the platform which carries the acquisition sensor, conventionally comprising one or more processors and associated memory.

The transmission unit 14 is configured to receive the data processed by the on-board calculation unit 13 with the set of acquisition parameters PA, and to transmit them to the remote calculation unit 20, after they have been optionally compressed 102*bis* by a compression module which may be found in the on-board calculation unit, or in the transmission unit 14.

The remote calculation unit 20 is configured to receive the transmitted data and to process them with the aim of constructing a high-resolution signal or image HR from the data pre-processed by the on-board calculation unit 13, after having optionally decompressed 102*ter* them.

In order to present in more detail an example of implementation of the method 100, a reference signal, or image, is defined, the reference signal being that which would be picked up by the acquisition sensor 11 configured with a sampling interval corresponding to the sampling interval, called reference sampling interval, desired for the high-resolution image.

Let HR be the reference high-resolution signal, or image thus defined.

The acquisition sensor 11, configured to acquire each low-resolution signal, or image, is modeled by a linear operator which makes it possible to pass from the reference high-resolution signal or image HR, to the low-resolution signal, or image, depending on the acquisition parameters PA.

In one form, a plurality of low-resolution images successively acquired by an acquisition sensor 11 carried by a moving wearer, each displacement of the acquisition sensor 11 relative to the scene between the acquisition of a low-resolution image and the acquisition of a subsequent low-resolution image corresponds to an offset associated with the low-resolution image of the plurality of images acquired by the sensor. It is then possible to define the linear operator Ad according to each offset of plurality of offsets d=(d1, d, dk) associated with each low-resolution image of the plurality of low-resolution images BR=(BRi), i=1 to K, so that:

$$A_d HR + \varepsilon = BR = (BR^1, \ldots, BR^i, \ldots, BR^k)$$ [Math 1]

Where each low-resolution image BRi is of size m×n, and the desired high-resolution image HR is of size M×N, and where $A_d$ is the linear operator from the set $R^{MN}$ to the set $R^{kmn}$ which models the process generating the plurality of low-resolution images BR=(BR$^1$, ..., BR$^i$, ..., BR$^k$) from the reference high-resolution image HR, ε being a measurement noise belonging to $R^{kmn}$.

The variational methods which make it possible in a known manner to invert the above equation to find HR from BR take the form of an improved problem which is solved by iterative algorithms whose implementation is generally too costly in calculation power to be performed on the on-board calculation unit 13. One way of getting around this technical difficulty consists in transmitting the plurality of low-resolution images BR=(BR$^1$, ..., BR$^i$, ..., BR$^k$) to the remote calculation unit 20 which has the desired calculation means. However, during this transmission operation, the stack is compressed and a compromise must be found between transmission quality and quantity of data to be transmitted. It turns out that the errors linked to the operation of transmitting the plurality of low-resolution images BR=(BR$^1$, ..., BR$^i$, ..., BR$^k$) may adversely affect the quality of the high-resolution image HR reconstructed by the remote calculation unit 20.

The present disclosure proposes an alternative to the transmission of the plurality of low-resolution images BR=(BR$^1$, ..., BR$^i$, ..., BR$^k$) making it possible both to reduce the quantity of data to be transmitted while improving the quality of the image reconstructed by the remote calculation unit 20. The present disclosure is based on the fact that the calculation of the solution to the aforementioned inversion problem desires only the knowledge of a pre-merged image equal to $A^*_d \cdot BR$, and not the knowledge of the plurality of low-resolution images BR=(BR$^1$, ..., BR$^i$, ..., BR$^k$), where $A^*_d$ is the adjoint operator of the operator $A_d$. It should be noted that $A^*_d \cdot BR$ is of size M×N and may in general be calculated on-board. It is then possible to transmit to the ground the pre-merged image $A^*_d \cdot BR$, however this image turns out to be in general too irregular to be effectively compressed.

This is why the image transmitted to the ground is a filtered pre-merged image $F_d(A^*_d \cdot BR)$ which satisfies the following constraints:

The calculation of the filtered pre-merged image $F_d(A^*_d \cdot BR)$ is possible at low cost, therefore possible on the on-board calculation unit 13;

The filtered pre-merged image $F_d(A^*_d \cdot BR)$ is effectively compressible, in the sense that the errors of the compression 102bis/decompression 102ter process are limited, therefore fairly regular and with a good signal-to-noise ratio;

The filtering function $F_d$ is invertible so that the pre-merged image $A^*_d \cdot BR$ may be reconstructed on the ground from the filtered pre-merged image $F_d(A^*_d \cdot BR)$, in order to then apply one of the variational methods for the reconstruction of the desired high-resolution image HR.

Thus, as illustrated in FIG. 1, in one form, the method 100 comprises the following steps:

acquisition 101 of the plurality of low-resolution signals BR;

measurement and/or estimation 101' of the set of acquisition parameters PA;

pre-merging 101a of the plurality of signals into the pre-merged signal $A^*_d \cdot BR$, by a calculation carried out by the on-board calculation unit 13, the pre-merged signal being a function of the plurality of signals and of the set of acquisition parameters PA of each of the plurality of low-resolution signals;

filtering 101b) of the pre-merged signal $A^*_d \cdot BR$, carried out by the on-board calculation unit 13;

transmission 102, by the transmission unit 14, of the filtered pre-merged signal $F_d(A^*_d \cdot BR)$ and of the set of acquisition parameters PA of each of the plurality of signals, without transmission of the plurality of signals;

calculation 103, by the remote calculation unit 20, of an estimate of the pre-merged signal by an inverse filtering of the filtered pre-merged signal $F_d (A^*_d \cdot BR)$;

determination 104, by the remote calculation unit 20, according to a variational method, of the high-resolution signal HR from the estimate of the pre-merged signal $A^*_d \cdot BR$ and of the set of acquisition parameters of each of the plurality of signals, the resolution of the merged signal being greater than a resolution of each of the plurality of signals.

According to one implementation, the filtering function $F_d$ may in one form be defined as the pseudo-inverse of a linear combination of the identity operator Id and of the operator equal to $A^*_d$ Ad, namely:

$$(a^* Id + b^*(A^*_d A_d))^{-1}$$ [Math 2]

According to the values chosen for the parameters a and b of the linear combination, different cases are to be distinguished:

a=1, b=0: then the filtered pre-merged image $F_d(A^*_d \cdot BR) = A^*_d \cdot BR$; this choice is not ideal because, even if the pre-merged image $A^*_d \cdot BR$ is sufficient, with the set of acquisition parameters PA, in one form the offsets, to solve the aforementioned variational issues, the pre-merged image turns out in general to be very irregular and therefore difficult to transmit to the ground in an efficient manner using conventional compressors, in one form based on decompositions into wavelet bases.

a=0, b=1: then the filtered pre-merged image $F_d(A^*_d \cdot BR) = (A^*_d A_d)^{-1} A^*_d \cdot BR$ which corresponds to the least-squares estimator which constitutes a good approximation of the desired high-resolution image HR therefore that the operator $A^*_d A_d$ is well conditioned. The conditioning is directly linked to the configuration of the offsets d=(d$^1$, d$^i$, ..., d$^k$) associated with each low-resolution image of the plurality of low-resolution images and of the displacements of the acquisition device 10 associated with these offsets. Typically, the more the displacements (modulo the low-resolution sampling interval) are uniformly distributed, the more the operator is well conditioned. The conditioning is also linked to the number k of low-resolution images in the plurality of low-resolution images BR=(BR$^1$, ..., BR$^i$, ..., BR$^k$).

a>0, b>0: then the filtered pre-merged image F$_d$(A*$_d$·BR) corresponds to the unique minimizer of the regularized least-squares energy, also called Tikhonov energy; this choice constitutes a compromise between the two preceding situations, and makes it possible to alleviate the possible bad conditioning of the operator A*$_d$ Ad which could make inoperative the calculation of the least-squares estimator according to the preceding option.

As indicated above, the method according to the present disclosure also applies, in one form, to signals obtained by interferometric spectrography; in this case:

the high-resolution signal is a spectrogram S(sigma) (or a hyperspectral cube S(x,y,sigma)) where sigma represents a wavelength, and S(sigma) represents the light energy measured at this wavelength. The instrument is configured to obtain the values of the signal S(sigma) for M values of sigma sampled regularly between sigma_min and sigma_max.

the low-resolution signal is an interferogram I(delta) (or an interferometric cube I(x,y,delta(x,y))), where the path difference delta takes m values sampled regularly between 0 and delta_max (in the case of the interferometric cube, m=1 and delta(x,y) take a pre-calibrated value known on each pixel (x,y)).

The instrument making it possible to measure the low-resolution signal may be for example a Michelson interferometer, a static Fourier transform interferometer like SIFTI (for an interferogram) or a spectro-imager like SIELETERS (for the interferometric cube)

A low-resolution signal is linked to the high-resolution signal by a linear operator A_delta such that I=A_delta*S, that is to say For an interferogram:

$$I(\delta_i) = \sum_{j=1}^{M} s(\sigma_j)(1 + \cos(2\pi\sigma_j\delta_i))$$

Or for an interferometric cube $$I(x, y, \delta(x, y)) = \sum_{j=1}^{M} S(x, y, \sigma_j)(1 + \cos(2\pi\sigma_j\delta(x, y)))$$

where $\sigma_j = \sigma_{min} + j * \frac{\sigma_{max} - \sigma_{min}}{M}$

The set of acquisition parameters of each low-resolution signal (equivalent to the offset in multi-image super-resolution) is the set of values of length differences delta that may vary from one acquisition to another For the operator A_delta to be invertible and well-conditioned, the number m must respect certain conditions given by the theorem of Shannon or generalized Shannon as appropriate. In one form if m<M then A_delta is not invertible and it is desired to have recourse to a plurality of low-resolution signals in order to be able to use them to reconstruct the spectrogram S (high-resolution signal).

The plurality of low-resolution signals is a set of interferograms I1, ..., IK (or interferometric cubes) corresponding each time to different values of delta.

In the case of a Michelson or Static Fourier transform interferometer such as SIFTI, this value of delta may be varied by moving the distances between the prisms.

In the case of the SIELETERS instrument, the variation in delta is obtained by an offset of the (airborne) instrument with respect to the scene between two shots. In this case, a precise estimate of this offset and a registration of the obtained images is desired in order to obtain the exact values of delta(x,y) for each registered image. In the event that this instrument is carried by a satellite, an accurate attitude estimation system of the instrument may be used in one form.

By taking a sufficient number K of low-resolution signals, a number of interferometric measurements K*m>M may be obtained sufficiently large to be able to invert the linear operator A_delta and obtain a good estimate of the spectrogram S. This inversion being (in the general case of an irregular sampling) poorly conditioned, it is often desired to achieve this to use variational methods having a computational cost too great to be executed on-board.

Our method applied to this case consists of:

Calculate on-board the adjoint of the operator A_delta applied to the plurality of signals in order to obtain a pre-merged signal of size M (instead of K*m).

$$(A_\delta^* * I)_j = \sum_{k=1}^{K} \sum_{i=1}^{m} I(\delta_i^k)(1 + \cos(2\pi\sigma_j\delta_i^k))j = 1, \dots, M$$

When the sampling of delta is irregular, we can use the NFFT algorithm for this operation to be numerically efficient Filter the pre-merged signal in order to obtain a more compressible signal Compress the filtered pre-merged signal and transmit it to the ground.

Also transmit the values of delta (acquisition parameters).

Decompress the filtered pre-merged signal on the ground, and apply the inverse filtering to obtain the pre-merged signal (A*$_\delta$*I)$_j$ Use the filtered pre-merged signal as part of a variational method to obtain the spectrogram (high-resolution signal) S.

According to one aspect, the present disclosure also relates to a device 10 for acquiring a signal for constructing a merged signal HR, the merged signal being called a high-resolution signal HR, from a plurality of signals BR acquired by the acquisition device 10, each signal of the plurality of signals BR, being called a low-resolution signal BR and comprising a plurality of samples measured by the acquisition device 10 configured according to a set of parameters of acquisition PA of the signal, the set acquisition parameters PA of each low-resolution signal BR comprising a sampling interval along at least one dimension, the sampling interval corresponding to a resolution of the low-resolution signal BR, and the resolution of the low-resolution signal BR being less than a resolution of the high-resolution signal HR. The device 10 comprising: an acquisition sensor 11 configured to acquire the plurality of low-resolution signals BR, measurement equipment 12 configured to measure and/or estimate the acquisition parameters PA, an on-board calculation unit 13 comprising: a module for processing the plurality of signals BR configured to pre-merge 101a the plurality of signals by calculating a pre-merged signal, as a function of the plurality of signals BR and of the set of acquisition parameters PA of each signal of the plurality of signals BR; and a filtering module configured to filter 101b the pre-merged signal.

The device further comprising a data transmission unit configured to transmit the filtered pre-merged signal to a remote calculation unit 20.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for constructing a merged signal, the merged signal is called a high-resolution signal, from a plurality of signals acquired by an acquisition device, each signal of the plurality of signals, is called a low-resolution signal, each signal including a plurality of samples measured by an acquisition sensor of the acquisition device configured according to a set of acquisition parameters of the signal, a set of acquisition parameters of each low-resolution signal including a sampling interval along at least one dimension, the sampling interval corresponding to a resolution of the low-resolution signal, the resolution of the low-resolution signal is less than a resolution of the high-resolution signal, the acquisition device including:
   the acquisition sensor configured to acquire a plurality of low-resolution signals,
   measurement equipment configured to measure and/or estimate the acquisition parameters,
   an on-board calculation unit, and
   a data transmission unit, configured to transmit data to a remote calculation unit, the method comprising:
   acquisitioning of the plurality of low-resolution signals;
   at least one of measuring and estimating of the set of acquisition parameters;
   pre-merging of the plurality of signals into a pre-merged signal, by a calculation carried out by the on-board calculation unit, the pre-merged signal is a function of the plurality of signals and of the set of acquisition parameters of each of the plurality of low-resolution signals;
   filtering of the pre-merged signal, carried out by the on-board calculation unit;
   transmitting, by the transmission unit to the remote calculation unit, of the filtered pre-merged signal and of the set of acquisition parameters of each of the plurality of signals, without transmission of the plurality of signals;
   calculating, by the remote calculation unit, of an estimate of the pre-merged signal by an inverse filtering of the filtered pre-merged signal;
   determining, by the remote calculation unit, according to a variational method, of the high-resolution merged signal from the estimate of the pre-merged signal and of the set of acquisition parameters of each of the plurality of signals, a resolution of the high-resolution merged signal is greater than a resolution of each of the plurality of signals.

2. The method according to claim 1, wherein each low-resolution signal of the plurality of low-resolution signals is a low-resolution image of a plurality of low-resolution images of a scene, wherein the pre-merged signal is a pre-merged image, and wherein the filtered pre-merged signal is a filtered pre-merged image, wherein the high-resolution merged signal is a merged image called a high-resolution image, wherein the set of acquisition parameters of each low-resolution image further comprises a plurality of offsets, each offset of the plurality of offsets is associated with a low-resolution image of the plurality of images, the offset associated with the low-resolution image corresponding to a displacement of the acquisition device relative to the scene between the acquisition of the low-resolution image and the acquisition of a subsequent low-resolution image, and wherein the at least one dimension of the sampling interval of a low-resolution image corresponds to at least one direction defined in a formation plane of the low-resolution image on the acquisition sensor.

3. The method according to claim 1, wherein the plurality of signals is modeled by an application of a linear operator to a reference signal acquired by the acquisition sensor of the acquisition device configured according to a sampling interval corresponding to the resolution of the merged high-resolution signal, and wherein the pre-merging step comprises applying an adjoint operator of the linear operator to the plurality of signals.

4. The method according to claim 3, wherein the filtering step does not modify the pre-merged signal.

5. The method according to claim 3, wherein the filtering step comprises applying, to the pre-merged signal, a pseudo-inverse of a product of the adjoint operator and of the linear operator.

6. The method according to claim 3, wherein the filtering step comprises applying a pseudo-inverse of a linear combination of an identity operator and a product of the adjoint operator and of the linear operator.

7. A use of the method according to claim 1 for merging the images acquired by the acquisition device according, operatively coupled to a portable computer so that the portable computer comprises the on-board calculation unit of the device and the transmission unit to a remote calculation unit, the portable computer is a tablet or a smart phone.

8. A use of the method according to claim 1 for merging the images acquired by the acquisition device, the acquisition device is on-board an aircraft is a drone.

9. A use of the method according to claim 1 for merging the images acquired by the acquisition device, the acquisition device is a medical imaging system.

10. A use of the method according to claim 1 for merging the images acquired by the acquisition device, the acquisition device is a spatial imaging system carried by a satellite.

11. A device for acquiring a signal for constructing a merged signal, the merged signal is called a high-resolution signal, from a plurality of signals acquired by an acquisition sensor of an acquisition device, each signal of the plurality of signals, is called a low-resolution signal, and including a plurality of samples measured by the acquisition sensor configured according to a set of acquisition parameters of the signal, a set of acquisition parameters of each low-resolution signal including a sampling interval along at least one dimension, the sampling interval corresponding to a resolution of the low-resolution signal, the resolution of the low-resolution signal is lower than a resolution of the high-resolution signal, the device comprising:
the acquisition sensor configured to acquire the plurality of low-resolution signals, wherein the acquisition sensor is modeled by a linear operator,
measurement equipment configured to at least one of measure and estimate the acquisition parameters,
an on-board calculation unit including:
a module configured to process the plurality of signals configured to pre-merge the plurality of signals by calculating a pre-merged signal, as a function of the plurality of signals and of the set of acquisition parameters of each of the plurality of signals, wherein the pre-merging comprises applying the adjoint operator of the linear operator to the plurality of signals; and
a filter module configured to filter the pre-merged signal; and
a data transmission unit configured to transmit the filtered pre-merged signal and the set of acquisition parameters to a remote calculation unit, without transmission of the plurality of signals.

12. The acquisition device according to claim 11, wherein the signal is an image of a scene, and wherein the set of acquisition parameters of each low-resolution image further comprises a plurality of offsets, each offset of the plurality of offsets is associated with a low-resolution image of the plurality of images, the offset associated with the low-resolution image corresponding to a displacement of the acquisition sensor relative to the scene between the acquisition of the low-resolution image and the acquisition of a subsequent low-resolution image, and wherein the at least one dimension of the sampling interval of a low-resolution image corresponds to at least one direction defined in a formation plane of the low-resolution image on the acquisition device,
wherein the processing module is configured to calculate a pre-merged image; and
wherein the filter module is configured to filter the pre-merged image;
the device further comprises a data transmission unit configured to transmit the filtered pre-merged image and the set of acquisition parameters to a remote calculation unit, without transmission of the plurality of images.

13. The device according to claim 12 wherein the filtering step comprises applying to the pre-merged image of a pseudo-inverse of a linear combination of an identity operator and a product of the adjoint operator and of the linear operator.

14. A computer program product comprising one or more non-transitory computer readable media comprising instructions executable on an on-board computer and instructions executable on a remote computer, the executable instructions are configured to implement the method according to claim 1.

* * * * *